United States Patent
Syed et al.

(10) Patent No.: US 6,907,325 B1
(45) Date of Patent: Jun. 14, 2005

(54) METHOD OF OPERATING A HYBRID ELECTRIC VEHICLE TO LIMIT NOISE, VIBRATION, AND HARSHNESS

(75) Inventors: Fazal U. Syed, Canton, MI (US); Ming Lang Kuang, Canton, MI (US); Ryan A. McGee, Ann Arbor, MI (US); Paul M. Gartner, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/605,351

(22) Filed: Sep. 24, 2003

(51) Int. Cl.$^7$ ................................................ G06F 7/00
(52) U.S. Cl. ........................................................ 701/22
(58) Field of Search ................... 701/22; 180/65.1–65.4

(56) References Cited

U.S. PATENT DOCUMENTS

| | | |
|---|---|---|
| 5,563,479 A | 10/1996 | Suzuki |
| 5,713,814 A | 2/1998 | Hara et al. |
| 5,722,502 A | 3/1998 | Kubo |
| 5,951,614 A | 9/1999 | Tabata et al. |
| 6,009,965 A | 1/2000 | Takanohashi et al. |
| 6,022,290 A | 2/2000 | Lyon |
| 6,026,921 A | 2/2000 | Aoyama et al. |
| 6,164,400 A | 12/2000 | Jankovic et al. |
| 6,307,276 B1 | 10/2001 | Bader |
| 2004/0168840 A1 * | 9/2004 | Kuang et al. .............. 180/65.2 |

* cited by examiner

Primary Examiner—Y. Beaulieu
(74) Attorney, Agent, or Firm—Brooks Kushman P.C.; Carlos Hanze

(57) ABSTRACT

A controller and a method for use in a vehicle to limit noise, vibration, and harshness (NVH) by controlling torque matching between a first power source and a second power source. A first and a second torque estimate are made for the first power source. The torque matching comprises calculating a correction factor based upon a comparison of the torque estimates made during steady-state operating conditions of the vehicle. The first torque estimate is based on operating parameters for the first power source and the second torque estimate is based on operating parameters for the second power source.

20 Claims, 4 Drawing Sheets

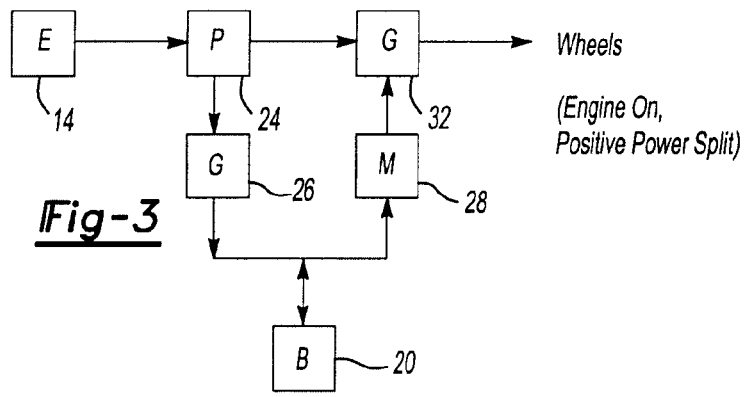
_Fig-3_ (Engine On, Positive Power Split)
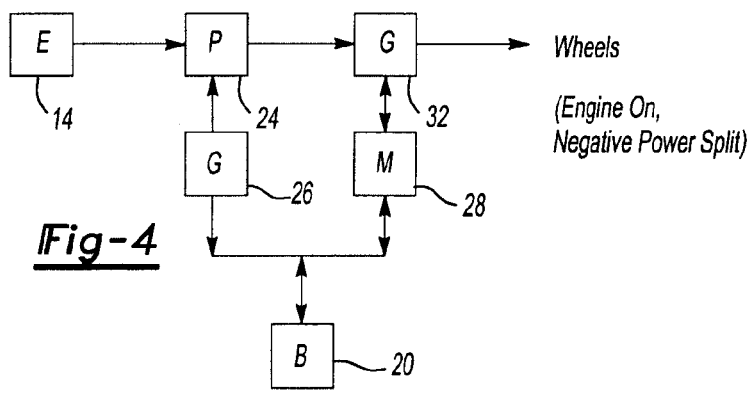
_Fig-4_ (Engine On, Negative Power Split)
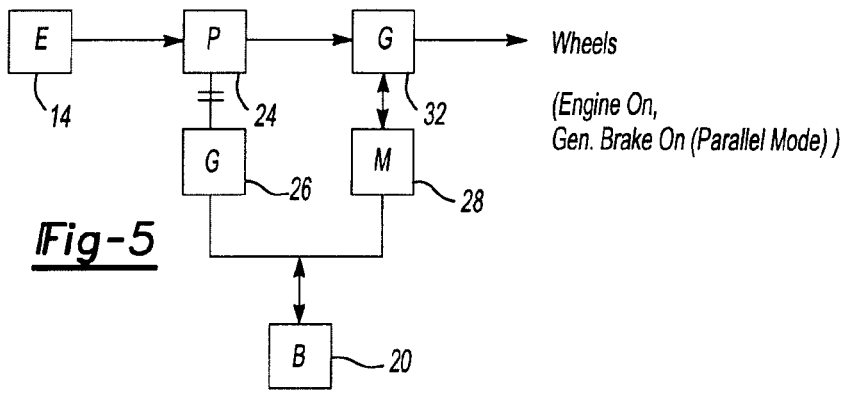
_Fig-5_ (Engine On, Gen. Brake On (Parallel Mode))
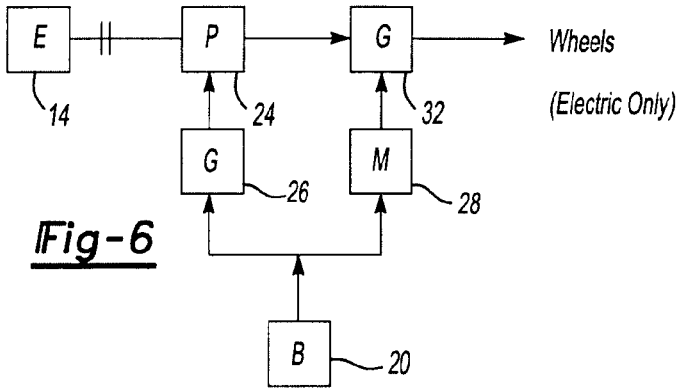
_Fig-6_ (Electric Only)

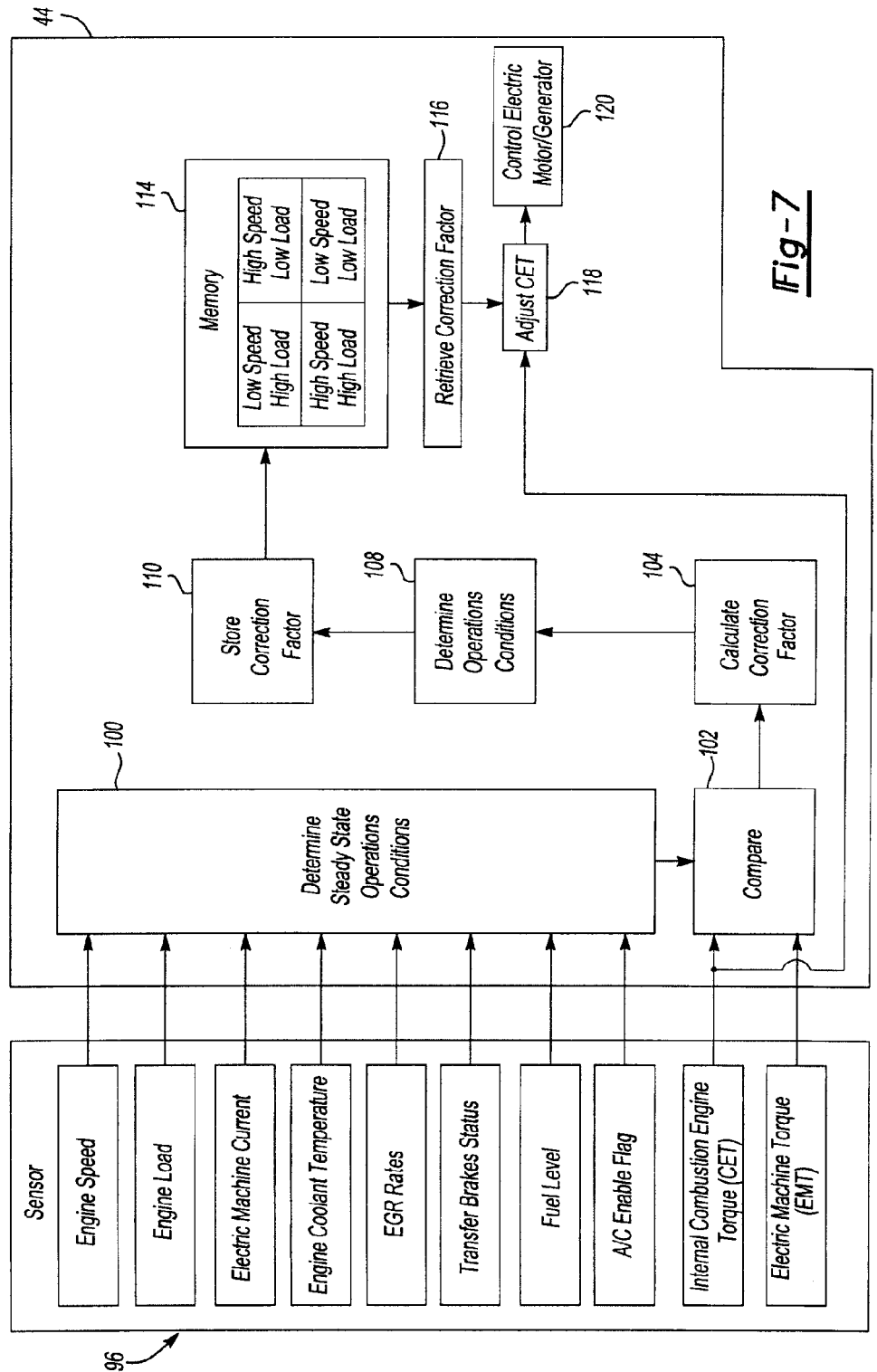

METHOD OF OPERATING A HYBRID ELECTRIC VEHICLE TO LIMIT NOISE, VIBRATION, AND HARSHNESS

BACKGROUND OF INVENTION

1. Field of the Invention

The present invention relates generally to the operation of a hybrid vehicle, and more particularly to method and system controller for controlling torque matching in a hybrid electric vehicle to limit noise, vibration, and harshness (NVH).

2. Background Art

Hybrid electric vehicles (HEVs) having a primary power source, whether the primary power source is an internal combustion engine or a fuel cell arrangement, typically include a transfer brake and a motor/generator to controllably transfer energy between the primary power source and a secondary electric system.

The transfer brake can be engaged to prevent the motor/generator from producing or receiving torque from the primary power source. The transfer brake is then disengaged to permit the motor/generator to produce or receive torque. It is desirable for the motor/generator torque to match the torque provided by the primary power source when the transfer brake is disengaged. The failure or mismatch of the motor/generator to match the torque of the primary power source can produced noise, vibration and harshness (NVH). In some cases, the NVH can cause erratic acceleration or deceleration, excessive vibration, or other discomforting sensation to be felt by the passengers.

The severity of the NVH is generally related to the degree of torque mismatching. As such, it is desirable to accurately determine the actual torque produced by the primary power source so that the motor/generator can be controlled to produce closely matching torque.

In the past, a torque estimate derived from operating parameters of the primary power source would be used by a vehicle system controller to match the motor/generator torque. One problem with this approach is that the operating parameters used to estimate the torque can and often do include inaccuracies which limit the accuracy of the estimated torque to the actual torque. This inaccuracy can make it difficult to match the motor/generator torque.

Accordingly, there exists a need to provide a more accurate estimate of the torque actually produced by the primary power source that would permit better torque matching during transfer brake disengagement.

SUMMARY OF INVENTION

The present invention overcomes the above-identified torque mismatching problem with a novel controller. According to one aspect of the present invention, the controller utilizes a torque correction factor to improve upon the accuracy of estimating torque actually produced by a primary power source. In this manner, torque produced by an motor/generator can be more accurately controlled to match torque produced by the primary power source during transfer brake disengagement. Consequently, noise, vibration and harshness (NVH) is limited.

One aspect of the present invention relates to a controller for use in a hybrid electric vehicle (HEV). The controller can be used with any HEV configuration which includes a transfer brake for braking a motor/generator. The controller, for example, can be used with a series hybrid electric vehicle (SHEV), a parallel hybrid electric vehicle (PHEV), or a parallel-series hybrid electric vehicle (PSHEV).

The controller can be used to control noise, vibration, and harshness (NVH) by matching torque produced by a primary power source, which is generally an engine or a fuel cell arrangement, with torque produced by the motor/generator during disengagement of the transfer brake.

With respect to the primary power source being an internal combustion engine, the controller is configured to determine a first torque estimate and a second torque estimate for the internal combustion engine. The first torque estimate is based on operating parameters for the internal combustion engine and the second torque estimate is based on operating parameters for the motor/generator. Preferably, the second torque estimate is a more accurate estimate of actual torque being produced by the internal combustion engine. In this manner, the second torque estimate can be used to increase the accuracy of the first torque estimate.

According to one aspect of the present invention, the controller compares the first torque estimate to the second torque estimate during steady-state vehicle operation. The comparison permits the controller to calculate a difference between the first and second torque estimates under steady-state operation. The difference is incorporated into a correction factor calculation. The correction factor can then be used to adjust the first torque estimate when the second torque estimate is unavailable, such as when the transfer brake is engaged.

The adjusted first torque estimate is a more accurate estimate of the torque actually being produced by the internal combustion engine. As such, when the transfer brake is disengaged, the controller can rely on the adjusted first torque estimate to match the torque provided by the motor/generator. In this manner, NVH and other discontinuities in demanded torque are limited.

BRIEF DESCRIPTION OF DRAWINGS

FIG. 3 illustrates a positive split mode of operation for the hybrid electric vehicle system;

FIG. 4 illustrates a negative split mode of operation for the hybrid electric vehicle system;

FIG. 5 illustrates a parallel mode of operation of the hybrid electric vehicle system;

FIG. 6 illustrates an electric mode of operation of the hybrid electric vehicle system; and FIG. 7 illustrates a process schematic of a controller in accordance with one aspect of the present invention.

DETAILED DESCRIPTION

Figure 1:
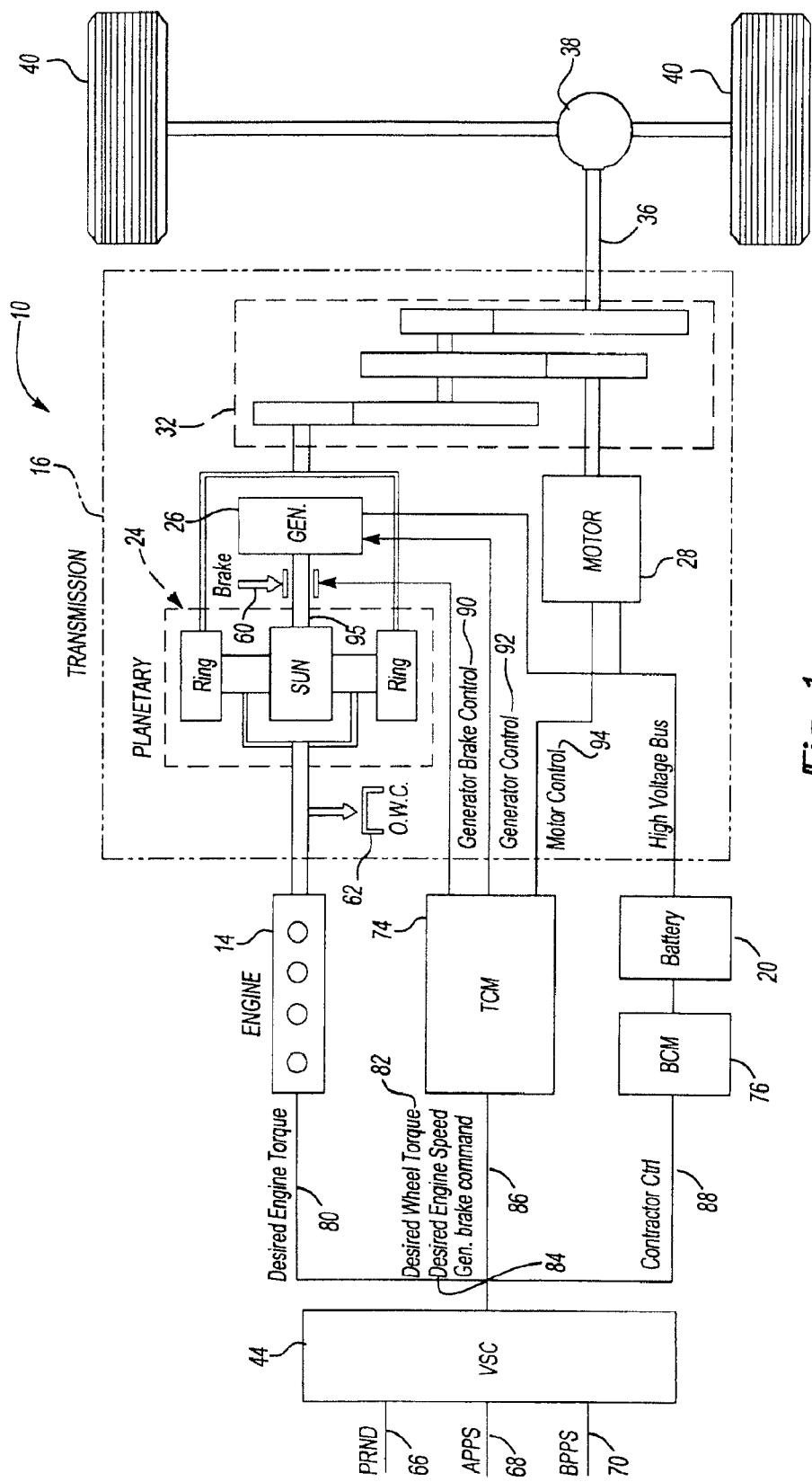
FIG. 1 illustrates an exemplary hybrid electric vehicle system that is controlled for torque matching in accordance with one aspect of the present invention.

FIG. 1 illustrates an exemplary hybrid vehicle that is commonly referred to as a parallel-series or "split power" hybrid vehicle (PSHEV) system 10. In accordance with the present invention, the HEV 10 is controlled to limit noise, vibration and harshness (NVH). The present invention, however, also is not limited to a particular type of HEV powertrain configuration.

The system 10 includes an engine 14, a transmission 16, and a battery 20 which operate with a planetary gear set 24, a generator 26, a motor 28, and meshing gears 32 to provide the torque. The torque is received by a torque shaft 36 for transfer to a differential axle 38 mechanism for final delivery to wheels 40.

Figure 2:
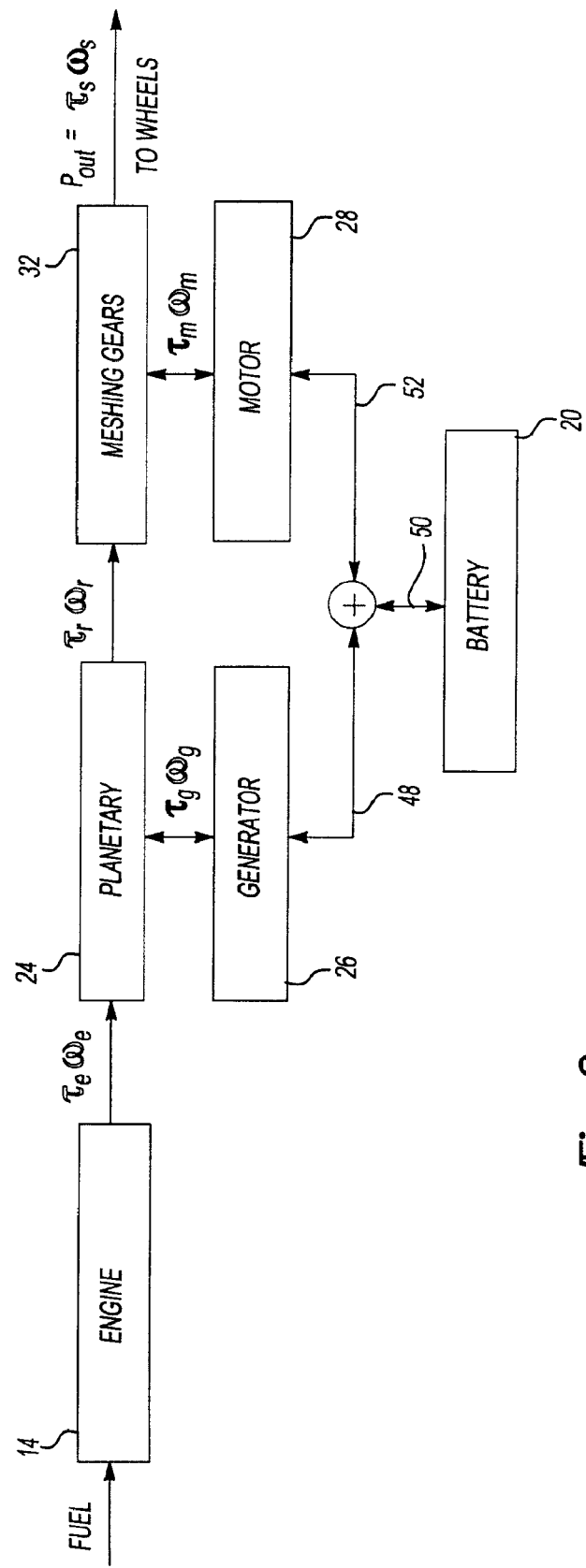
FIG. 2 illustrates power and torque flow in the hybrid electric vehicle system.

The system 10 provides torque for driving the hybrid vehicle. The manner in which torque is provided is variable and controllable by a vehicle system controller 44. FIG. 2 illustrates the variable and controllable means by which the vehicle system controller 44 can control power distribution in the system 10 for providing torque to the wheels 40.

In general, fuel is delivered to the engine such that the engine 14 can produce and deliver torque to the planetary gear set 24. The power provided from the engine 14 is expressed as $T_e\omega_e$, where $T_e$ is engine torque and $\omega_e$ is engine speed. Power delivered from the planetary gear set 24 to the meshing gears 32 is expressed as $T_r\omega_r$, where $T_r$ is ring gear torque and $\omega_r$ is ring gear speed. Power out from the meshing gears 32 is expressed as $T_s\omega_s$, where $T_s$ is the torque of shaft and $\omega_s$ is the speed of the torque shaft, respectively.

The generator 26 can provide or receive power from the planetary gear set 24. This is shown with the double arrows and expressed as $T_g\omega_g$, wherein $T_g$ is the generator torque and is $\omega_g$ the generator speed. As shown with path 48, the generator 26 can then supply power to or receive power from the battery 20 or the motor 28 during regenerative braking. As shown with path 50, the battery 20 can store energy received from the generator 26 and the motor 28 and it can release energy to the generator 26 and the motor 28. As shown with path 52, the motor 28 provides power to and receives power from the generator 26 and the battery 20. In addition, the motor 28 provides power to and receives power from the meshing gears 32. This is shown with the double arrows and expresses as $T_m\omega_m$, where $T_m$ is motor torque and $\omega_m$ is motor speed.

FIGS. 3–6 provide further illustration of the flow of power and the production of torque in the system 10.

FIG. 3 illustrates a positive split mode of operation of the HEV powertrain of FIG. 1. In this mode, the engine power is split between the meshing gears 32 and the generator 26, respectively. The splitting of power is controlled by the planetary gear set 24. The meshing gears 32 use the power received from the planetary gear set 24 to provide torque to the wheels 40. The battery 20 and the motor 28 can be controlled to receive power from generator 26. The motor 28 can provide torque to the meshing gears 32 based on power receive from one or both of the generator 26 and the battery 20.

FIG. 4 illustrates a negative split mode of operation. In this mode, the generator 26 inputs power to the planetary gear unit 24 to drive the vehicle while the motor 28 acts as a generator and the battery 20 is charging. It is possible, however, that under some conditions the motor 28 may distribute power to the meshing gearing 32, in which case the battery 20 would power both the generator 26 and the motor 28.

FIG. 5 illustrates a parallel mode of operation. In this mode, a generator brake 60 is activated and the battery powers the motor 28. The motor 28 then powers the meshing gearing 32 simultaneously with delivery of power from the engine 14 delivered to the meshing gearing 32 by way of the planetary gear set 24. Alternatively, the motor 28 can act as a generator to charge the battery 20 while the engine 14 provides power to the wheels 40 or during regenerative braking.

FIG. 6 illustrates an electric only mode. In this mode, a one way clutch 62 brakes the engine. The motor 28 draws power from the battery 20 and effects propulsion independently of the engine 14, with either forward or reverse motion. The generator 26 may draw power from the battery 20 and drive against a reaction of the one-way coupling 62. The generator 26 in this mode operates as a motor.

The vehicle system controller 44 (VSC) selects the power and torque delivery mode based on the vehicle operating conditions and a predefined strategy. To this end, the vehicle system controller 44 receives a signal from a transmission range selector 66 (PRND), a desired engine torque request 68, as shown at, which is dependent on accelerator pedal position sensor output (APPS), and a brake pedal position sensor 70 (BPPS).

In response to the received signals, the vehicle system controller 44 generates signals to the engine 14, a transmission control module 74 (TCM), and a battery control module 76 (BCM). Theses signals include a desired engine torque 80, a desired wheel torque 82, a desired engine speed 84, a generator brake command 86, a signal 88 indicating battery contactor or switch is closed after vehicle "key-on" startup. The modules then provide further signal to control the hybrid vehicle, such as a generator brake control 90, a generator control 92, and a motor control 94. Rather, the present invention can be used with any number of different motor driven vehicles, whether electric driven, mechanically driven, or driven by a combination of electrical and mechanical means.

Torque produced by the internal combustion engine 14 is estimated by the vehicle system controller 44 according to operating conditions of the internal combustion engine 14. The operating conditions typically include spark timing, air flow rate, speed, and load, but other engine operating parameters could be used.

Torque received or produced by the motor/generator 26 has a known relationship with torque produced by the internal combustion engine 14. This permits estimating engine torque production based on operating parameters for the motor/generator 26. Typically, current in the motor/generator 26 is used to estimate torque produced by the internal combustion engine 14.

In general, the torque estimates derived from the motor/generator 26 are more accurate of the actual torque produced by the engine 14 in comparison to the accuracy of the torque estimates based on the operating conditions of the engine 14. The motor/generator 26, however, cannot be used for such estimations when the motor/generator 26 is not producing or receiving torque. Rather, the controller 44 must rely on an engine torque estimate derived from the engine operating parameters.

The motor/generator is unavailable for estimating torque if the transfer brake 60 is engaged with connector 95. Connector 95 connects the motor/generator to the planetary gear set. The transfer brake 60 physically presses against the connector 95 to prevent the connector 95 from rotating. Typical operation requires engaging and disengaged the transfer brake 60.

During disengagement, torque produced by the motor/generator 26 should match torque produced by the internal combustion engine 14. NVH can arise depending on the degree to which the torque provided by the motor/generator 26 fails to match the torque provided by the internal combustion engine 14. Torque matching does not require equal levels of torque production, although it can. Rather, torque matching refers to a predefined range of torque production of the internal combustion engine 14 relative to the motor/generator 26. The relationship can change under different driving conditions and control methodologies.

The controller 44 compares the torque estimate derived from the internal combustion engine 14 operating parameters to the torque estimate derived from the motor/generator 26 operating parameters. Preferably, the controller 44 determines the correction factor during steady-state operation.

Steady-state operation occurs when the transfer brake 60 is released and the vehicle is operating under predefined conditions. Steady-state operation preferably eliminates transient torque requests. For example, steady-state can occur when an engine load is within a predefined range for a predefined period of time or when an engine speed is within a predefined range for a predefined period of time. The controller includes a number of vehicle operating inputs that can be used to determine whether the vehicle is in steady-state operation.

The comparison permits the controller to calculate a difference between the two torque estimates under steady-state operation. The difference is incorporated into a correction factor calculation. The correction factor can then be used to adjust the torque estimates derived from operating conditions of the internal combustion engine 14.

The adjusted torque estimate is a more accurate estimate of the torque actually being produced by the internal combustion engine 14. As such, when the transfer brake 60 is disengaged, the TCM controller 74 can rely on the adjusted torque estimate to to control the motor/generator 26 to match the torque provided by the engine 14.

FIG. 7 illustrates schematically the operation of controller 44 to limit NVH. The controller 44 receives a number of inputs from a number of vehicle sensors. The inputs are generally referred to with reference numeral 96. The inputs 96 include an internal combustion engine torque estimate (CET) input, an motor/generator torque estimate (EMT), an engine speed input, an engine load input, an motor/generator current, an engine coolant temperature, a EGR rate input, a brake status flag input, an fuel level input, and an air conditioning input.

The CET input and the EMT input are torque estimates for the engine 14. The EMT input is based on operating conditions for the engine 14 and the CET input is based on operating conditions for the motor/generator 26. As described above, the CET input is more accurate of the actual torque produced by the engine 14. The CET and EMT inputs are typically from other controllers in the HEV 10, such as an engine controller and an motor/generator controller. However, the controller 44 could be configured to calculate these values.

The controller 44 determines at block 100 whether the vehicle 10 is operating under steady-state conditions. This is part of the process because it is more desirable to calculate the correction factor from data collected during steady-state operation. The controller 44 monitors the input sensors 96 to make this determination. A comparison of CET to EMT occurs at block 102 if steady-state operation is determined. The comparison typically comprises calculating a difference between the CET value and the EMT value. The comparison, however, can include an algorithm or other manipulation of the CET and EMT values.

A correction factor is then calculated at block 104 based on the comparison block 102. The correction factor generally corresponds with the difference between the CET and the EMT values. With respect to the split power system shown in FIG. 1, nominally the CET value can be different from the EMT value up to a range of 10–15%. The correction would correspond with this percentage to adjust the CET value accordingly. Of course, as one of ordinary skill in the art will appreciate, the correction value calculation can vary depending on various factors, including the type and configuration of the engine 14 and the generator 24. As describe below, the correction factor is preferably constantly updated from repeated correction factor computations.

At block 108, the operating conditions proximate the time of determining the correction factor are determined and stored. The correction factor is then stored at block 110 with the corresponding operating conditions from block 108.

An memory 114 stores the correction factor and the corresponding operating conditions. The memory 114 preferably stores at least one correction factor for each of a number of operating conditions corresponding with low engine speed in high engine load, high engine speed in low engine load, high engine speed in high engine load, and low engine speed in low engine load.

The stored correction factors are retrieved at block 116 according to the operating conditions determined at block 108 for each correction factor. The correction factor corresponding with the current vehicle operating condition is retrieved. For example, if the current operating condition is low speed and low load, then the correction factor corresponding with low speed and low load is retrieved.

The retrieved correction factor is then used to adjust the CET value at block 118. The forgoing process continuously calculates and stores and updates the correction factors during steady-state operation. This allows the controller 44 to continuously update the stored correction factors.

The transfer brake input is monitor throughout the process so that the controller can determine when the transfer brake 60 engages the connector 95. Typically, the EMT input is used unless the transfer brake is engaged because the EMT input is more accurate than the CET value of engine torque. However, once the transfer brake 60 is engaged, the controller 44 at block 118 adjusts the CET value according to the correction retrieved at block 116. The adjusted CET values continue to be adjusted until the transfer brake 60 is disengaged.

The TCM controller 74 uses the CET values adjusted at block 118 to control the motor/generator 26 at block 120 The motor/generator 26 is controlled to provide a torque based on the adjusted CET value. Accordingly, the torque provided by the motor/generator should match the torque provided by the engine 14 within a predefined range to limit NVH.

While the best mode for carrying out the invention has been described in detail, those familiar with the art to which this invention relates will recognize various alternative designs and embodiments for practicing the invention as defined by the following claims.

What is claimed is:

1. A method for use in a vehicle requiring torque matching between a first power source and a second power source during a transition from the first power source solely providing torque to a combination of the first power source and the second power source providing torque, the method comprising:

determining a first torque estimate for the first power source based on operating parameters for the first power source;

determining a second torque estimate for the first power source based on operating parameters for the second power source;

determining a steady-state operating condition of the vehicle;

comparing the first torque estimate to the second torque estimate if the steady-state operating condition is determined; and calculating a torque correction factor based upon the comparison of the first torque estimate to the second torque estimate, wherein the correction factor is used to adjust the first torque estimate to control torque mismatching between the first power source and the second power source during the transition from the first power source solely providing torque to the combination of the first power source and the second power source providing torque.

2. The method of claim 1, wherein the first power source is an internal combustion engine and wherein steady-state operation is determined if an engine load is within a predefined range for a predefined period of time.

3. The method of claim 1, wherein the first power source is an internal combustion engine and wherein steady-state operation is determined if an engine speed is within a predefined range for a predefined period of time.

4. The method of claim 1, wherein the first power source is an internal combustion engine and wherein the method further comprises storing a number of the correction factors in a memory according to an engine speed and an engine load occurring proximate a time of calculating the correction factors, wherein each stored correction factor is retrievable based on the speed and load.

5. The method of claim 4, further comprising controlling an amount of torque produced by the second power source based on retrieving the correction factor stored for the speed and load that corresponds with a present speed and load proximate a time of the transition.

6. The method of claim 1, wherein the second power source is a motor/generator and wherein determining the second torque estimate comprises measuring current in the motor/generator, wherein the second torque estimate is a more accurate estimate torque provided by the first power source than the first torque estimate.

7. The method of claim 1, wherein a first correction factor is used to adjust the first torque estimate during transitions occurring under low speed and high load, a second correction factor is used to adjust the first torque estimate during transitions occurring under high speed and low load, a third correction factor is used to adjust the first torque estimate during transitions occurring under low speed and low load, and a fourth correction factor is used during transactions occurring under high speed and high load.

8. The method of claim 1, wherein the vehicle is a hybrid electric vehicle (HEV) and wherein the method further comprises releasing a transfer brake and controlling an amount of torque produced by the second power source during the release of the transfer brake based on adjusting the first torque estimate according to the correction factor such that the amount of torque produced by the second power source matches the torque produced by the first power source within a predefined range.

9. The method of claim 1, wherein the correction factor is a value determined by calculating a difference between the first torque estimate and the second torque estimate.

10. The method of claim 1, wherein the correction factor is a weighted value of the difference between the first torque estimate and the second torque estimate.

11. A method for use in a hybrid electric vehicle (HEV) requiring torque matching during a transition from a first state to a second state, wherein the first state comprises an internal combustion engine providing torque to a planetary gear set while a transfer brake prevents a motor/generator from providing torque to or receiving torque from the planetary gear set and the second state comprises releasing the transfer brake so that the internal combustion engine provides torque to the planetary gear set in combination with the motor/generator providing torque to the planetary gear set, the method comprising:

determining a first torque estimate for the internal combustion engine based on operating parameters for the internal combustion engine;

determining a second torque estimate for the internal combustion based on operating parameters for the motor/generator;

determining a steady-state operating condition for the HEV;

comparing the first torque estimate to the second torque estimate if the steady-state operating condition is determined;

calculating a torque correction factor from the comparison of the first torque estimate to the second torque estimate; and releasing the transfer brake while simultaneously controlling the motor/generator to provide torque based on the first torque estimate being adjusted according to the correction factor.

12. A system for use in a hybrid electric vehicle (HEV) to control noise, vibration, and harshness (NVH) due to a torque mismatch arising during a transition from a first state to a second state, wherein the first state including an internal combustion engine providing torque to a planetary gear set while a transfer brake prevents a motor/generator from providing torque to or receiving torque from the planetary gear set and the second state including releasing the transfer brake so that the internal combustion engine provides torque to the planetary gear set in combination with the motor/generator providing torque to the planetary gear set, the system comprising:

means for determining a first torque estimate for the internal combustion engine based on operating parameters for the internal combustion engine;

means for determining a second torque estimate for the internal combustion based on operating parameters for the motor/generator;

means for determining a steady-state operating condition for the HEV;

means for comparing the first torque estimate to the second torque estimate if the steady-state operating condition is determined; and means for calculating a torque correction factor from the comparison of the first torque estimate to the second torque estimate, wherein the correction factor is for use in adjusting the first torque estimate so that the adjusted first torque estimate can be used to limit NVH by controlling torque mismatching during the transition.

13. The system of claim 12, wherein steady-state operation is determined if an engine load is within a predefined range for a predefined period of time.

14. The system of claim 12, wherein steady-state operation is determined if an engine speed is within a predefined range for a predefined period of time.

15. The system of claim 12, further comprising means for calculating and storing a number of the correction factors in a memory based on an engine speed and an engine load occurring proximate a time of calculating the correction factor, wherein each stored correction factor is retrievable based on the speed and load.

16. The system of claim 15, further comprising means for controlling an amount of torque produced by the motor/generator based on retrieving the correction factor stored for the speed and load that corresponds with a speed and load proximate a time of the transition.

17. The system of claim 12, wherein the second torque estimate is based on current in the motor/generator, and wherein the second torque estimate is a more accurate estimate of torque from the first power source than the first torque estimate.

18. The system of claim 12, further comprising means for storing four corrections factors in a memory such that a first correction factor is used to adjust the first torque estimate during transitions occurring under low speed and high load, a second correction factor is used to adjust the first torque estimate during transitions occurring under high speed and low load, a third correction factor is used to adjust the first torque estimate during transitions occurring under low speed and low load, and a fourth correction factor is used to adjust the first torque estimate during transitions occurring under high speed and high load.

19. The system of claim 12, further means for releasing the transfer brake and for controlling an amount of torque produced by the motor/generator during release of the transfer brake based on adjusting the first torque estimate according to the correction factor such that the amount of torque produced by the motor/generator matches the torque produced by the internal combustion engine within a predefined range.

20. The system of claim 12, wherein the correction factor is a value determined by a difference between the first torque estimate and the second torque estimate.

* * * * *